United States Patent [19]

Stupp et al.

[11] Patent Number: 4,481,447
[45] Date of Patent: Nov. 6, 1984

[54] POWER SUPPLY FOR A MAGNETRON

[75] Inventors: Edward H. Stupp, Spring Valley, N.Y.; Mark W. Fellows, Monroe, Conn.

[73] Assignee: U.S. Philips Corporation, New York, N.Y.

[21] Appl. No.: 390,107

[22] Filed: Jun. 21, 1982

[51] Int. Cl.³ ............... H05B 39/00; H05B 41/14
[52] U.S. Cl. .................. 315/101; 219/10.55 B; 331/86; 315/39.51; 315/105; 315/107
[58] Field of Search ............ 315/39.51, 101, 105, 315/106, 107; 219/10.55, 10.55 B; 363/59, 60, 61; 331/86, 87

[56] References Cited

U.S. PATENT DOCUMENTS

| | | | |
|---|---|---|---|
| 3,121,835 | 2/1964 | Diebold | 363/59 |
| 3,259,830 | 7/1966 | Ojelid | 363/61 |
| 3,396,342 | 8/1968 | Feinberg | 328/262 |
| 3,569,855 | 3/1971 | Noda | 331/86 |
| 3,684,978 | 8/1972 | Otaguro | 219/10.55 B |
| 4,017,702 | 4/1977 | Harmon et al. | 219/10.55 B |
| 4,042,871 | 8/1977 | Grubbs et al. | 363/61 |
| 4,106,086 | 8/1978 | Holbrook et al. | 363/60 |
| 4,130,749 | 12/1978 | Tanaka et al. | 219/10.55 B |
| 4,186,436 | 1/1980 | Ishiwatari | 363/60 |
| 4,210,795 | 7/1980 | Lentz | 219/10.55 |
| 4,214,174 | 7/1980 | Dickson | 307/229 |
| 4,220,841 | 9/1980 | Oguro | 219/10.55 |
| 4,268,779 | 5/1981 | Echelberger et al. | 315/105 |
| 4,275,437 | 6/1981 | Boll et al. | 363/60 |
| 4,296,296 | 10/1981 | Echelberger et al. | 219/10.55 |
| 4,356,431 | 10/1982 | Feinberg | 315/39.51 |

FOREIGN PATENT DOCUMENTS

| | | | |
|---|---|---|---|
| 53-39806 | 4/1978 | Japan | 315/101 |
| 1524722 | 9/1978 | United Kingdom | 315/101 |

OTHER PUBLICATIONS

Wechsler, R., "Solid-State Power Control of Microwave Ovens", *Appliance Engineer*, Dec. 1976, pp. 72–74.
*Electronic Designers' Handbook*, Second Edition, L. J. Giacoletto, Editor, McGraw-Hill Book Co.

Primary Examiner—Saxfield Chatmon
Attorney, Agent, or Firm—Marc D. Schechter

[57] ABSTRACT

A method of controlling the power output of a magnetron tube, and an electric power supply for supplying power to the tube. According to the method, power is continuously supplied to the magnetron heater. At the same time, a voltage is continuously applied across the anode and the cathode of the tube. This voltage across the anode and the cathode varies in cycles between a first value, which is substantially at or below the threshold voltage of the magnetron tube, and a second value, which is above the threshold voltage. The average magnetron power output is determined by the proportion of each cycle during which the voltage across the anode and the cathode is above the threshold voltage.

10 Claims, 4 Drawing Figures

POWER SUPPLY FOR A MAGNETRON

BACKGROUND OF THE INVENTION

The invention relates to magnetron power supplies. A magnetron is a thermionic vacuum tube which generates microwave power, for example microwave cooking power.

A magnetron tube has two concentric cylindrical electrodes. The inner electrode is the cathode and the outer electrode is the anode. The anode is divided into segments which form the walls of resonant cavities within the tube. In operation, electrons are extracted from the cathode and are accelerated toward the anode. By immersing the tube in a magnetic field and adjusting the voltage across the anode and the cathode, the electrons can be made to circulate around the cathode. The energy of the circulating electron cloud is then coupled into the cavities which are resonant at a microwave frequency. Microwave oscillation modes can then be extracted from the tube.

In order to produce the circulating electron cloud, the voltage across the anode and the cathode must be above a threshold value. The threshold value is the voltage above which the magnetron tube begins to conduct an electric current. Below the threshold, the circulating electrons never reach the anode. Instead, they spiral back toward the cathode under the influence of the forces created by the magnetic field.

There are two well known inherent related problems in connection with the operation of magnetrons. First, the magnetron anode current varies rapidly as a function of the anode voltage above the threshold value, and it is very difficult to control this current. In order to overcome this problem, most magnetron power supplies utilize a current limiting transformer design. (See, for example, U.S. Pat. No. 3,396,342.)

The second problem is concerned with the control of the output power of the magnetron. Although the magnetron is a nonlinear device, it behaves as a positive resistance in that an increase in the applied voltage produces an increase in the current flowing therethrough. However, because small changes in the applied voltage produce large variations in the current, voltage control of the magnetron power output is not practical.

While various methods and circuits have been proposed for controlling the average magnetron output power without controlling the voltage applied to the magnetron, the most often used method consists of cycling the entire magnetron power supply on and off. (See, for example, U.S. Pat. No. 4,220,841; United Kingdom Pat. No. 1,524,722; Wechsler, "Solid-state power control of microwave ovens," *Appliance Engineer*, December 1976.) During the "on" part of the cycle, the magnetron produces essentially 100% power output. The higher the ratio of "on"-time to "off"-time, the greater the average power output of the tube.

This method of controlling the magnetron power has at least two major disadvantages. First, in most power supplies the magnetron cathode heater is powered by a secondary winding on the main power transformer which supplies the high voltage to the magnetron's cathode. By repeatedly cutting off the power to the primary of the transformer, not only is the high voltage cycled between zero and the cathode operating voltage, but the tube filament is also repeatedly cooled down and cold started. Such a destructive process shortens the tube life due to cathode deterioration.

Second, the transient voltages induced in the high voltage power supply by cycling it on and off can greatly exceed the normal operating voltages, due to inductive effects. Consequently, the circuit components must be designed to withstand these much higher voltages, resulting in increased volume, weight, and cost for the magnetron power supply.

Other methods of controlling a magnetron's power output have also been proposed. For example, instead of placing a switch in the primary circuit of the power transformer, a switch can be placed in the high voltage secondary circuit (U.S. Pat. No. 4,220,841.) In this arrangement, the tube is no longer cooled down and cold started in each cycle. However, this method requires an expensive high voltage switch, expensive safety measures to insulate the operator of the device from high voltages, and expensive components to withstand the high voltage transients which are still present.

Finally, in another method the magnetron power output is controlled by systematically opening and closing the power circuit to the magnetron heater, while leaving the high voltage supply connected to the magnetron's cathode. (U.S. Pat. No. 4,220,841.) The problem with this method is, of course, that the tube is operated largely in the temperature-limited emission mode (rather than in the space-charge limited emission mode) which is destructive to the cathode and shortens the tube life.

SUMMARY OF THE INVENTION

It is an object of the invention to provide a power supply for a magnetron tube and a method of controlling the power output of a magnetron tube which operates in a less destructive manner than in the past, thereby resulting in a longer tube lifetime.

It is a further object of the invention to provide a power supply for a magnetron tube and a method of controlling the power output of a magnetron tube which produce lower voltage transients than in the past, thereby allowing one to manufacture the power supply using lower cost parts, lower weight parts, and smaller volume parts.

According to the invention, these objects are achieved in a new method of controlling the power output of a magnetron tube. In this method, power is supplied continuously to the tube heater, and a voltage is continuously applied across the tube anode and cathode. In order to control the average power output of the tube, the voltage across the anode and cathode is varied between a first value, which is substantially at or below the threshold voltage, and a second value, which is above the threshold voltage. Since the tube generates microwave power only when the voltage across the anode and the cathode is above the threshold voltage, this cycling method can control the tube's average power output by varying the ratio between the time the voltage is at the first value and the time the voltage is at the second value.

Operation of the magnetron tube according to the invention is less destructive than prior methods because the power to the tube heater either remains constant throughout each cycle or is only varied a small amount. Moreover, because the voltage across the anode and the cathode is varying within a much smaller range than in the prior art (only between a value substantially at or below the threshold voltage and a value which is above the threshold voltage) the transient voltages generated in the power supply are expected to be of lower magnitude than those generated in prior devices.

An electric power supply according to the invention includes power supply means for continuously supplying power to the heater, and voltage supply means for continuously supplying a voltage across the anode and the cathode of the tube. The voltage supply means repeatedly varies the voltage in cycles between a first value, which is substantially at or below the threshold voltage, and a second value, which is above the threshold voltage.

A microwave generator according to the invention includes a magnetron tube having a heater, a cathode, and an anode. The generator also includes an electric power supply including power supply means for continuously supplying power to the heater, and voltage supply means for continuously supplying a voltage across the anode and the cathode of the tube. The voltage repeatedly varies in cycles between a first value which is substantially at or below the threshold voltage, and a second value, which is above the threshold voltage.

Thus, by varying the magnetron's anode/cathode voltage between nonzero values above and below the threshold, lower transient voltages are generated in the power supply and the mode of operation of the magnetron is less destructive thereto.

DESCRIPTION OF THE PREFERRED EMBODIMENTS

Figure 1:
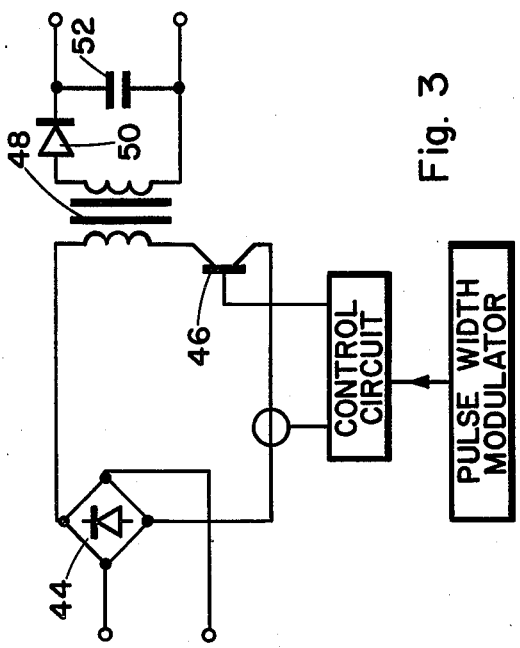
FIG. 1 is a schematic diagram of two alternate embodiments of an electric power supply according to the invention for supplying power to a magnetron tube.

Two relatively uncomplicated embodiments of the invention are shown in FIG. 1. In one embodiment, transistor switch 10 would be deleted. In the other embodiment, transistor switch 12 would be deleted, and capacitor 20 would be directly connected to node 13 (as though switch 12 were present and closed).

The circuit shown in FIG. 1 is a novel application of established principles of voltage multiplication. When transistor switch 10 is open (nonconductive) and transistor switch 12 is closed (conductive) the voltage multiplier circuit operates in the following manner. An alternating voltage, $V_{in} = V_p \sin \omega t$, is supplied to the input of the circuit as shown. This voltage is half-wave rectified by diode 14 so that capacitor 16 can be charged through diode 14 but cannot be discharged through diode 14. Consequently, node 18 is clamped to a voltage near $+V_p$.

Having shown how diode 14 and capacitor 16 set the voltage at node 18 at substantially $+V_p$, we can now analyze the operation of capacitor 20 and diode 22. These components operate to inject the input voltage, $V_{in}$, to the node 24. Since the node 18 is at a voltage of $+V_p$, the voltage at node 24 becomes $V_p + V_p(1 + \sin \omega t)$. Now, as a consequence of diode 26, the capacitor 28 is charged to a value of $+3V_p$. However, since the capacitor 28 cannot discharge through diode 26, the voltage at node 30 is clamped to a value of $+3V_p$.

Capacitor 32 and diode 34 operate in the same manner as capacitor 20 and diode 22 to pass the input voltage, $V_{in}$, through to node 36. The diode 38 and the capacitor 40 then operate in the same manner as diode 14 and capacitor 16 (or diode 26 and capacitor 28) in order to clamp the voltage at node 42 to a value of $+5V_p$. Consequently, the multistage circuit shown in FIG. 1 can theoretically produce a DC output of $+5V_p$ from an AC peak input of $V_p$.

In selecting the components for use in the voltage multiplier circuit shown in FIG. 1, each diode must be able to withstand a reverse voltage of at least $2V_p$. Moreover, component selection must be consistent with the overall output power levels desired.

According to the invention, the voltage multiplier circuit includes either transistor switch 10 or transistor switch 12. If switch 12 is deleted, capacitor 20 is electrically connected directly to anode 13. With transistor switch 10 open (nonconducting) and with transistor switch 12 closed (conducting) the voltage multiplier circuit performs in the manner described above. However, by closing transitor switch 10 one can effectively remove diode 22 from the circuit. As a consequence of this, the function of the multiplication stage comprising capacitor 20 and diode 22 is modified. The potential at node 18 now varies as $(V_p + V_p \sin \omega t)$. As a consequence, the output voltage is reduced by $V_p$.

Alternatively, if transistor switch 10 is deleted and transistor switch 12 is opened, the capacitor 20 is effectively removed from the circuit. This effectively eliminates a multiplication stage from the voltage multiplier, this time resulting in a drop of the output voltage by $2V_p$.

Either transistor switch 10 or transistor switch 12 (or, if desired, both) can be used to vary the output voltage in the manner described above. Because of its location in the circuit, switch 10 would not need to meet as high power requirements as switch 12.

In magnetron tubes, such as Amperex (trademark) magnetron tube OM72, it is desirable, according to the invention, to vary the anode-to-cathode voltage in a range of approximately 500 volts, with the minimum voltage being at 3500 volts (the threshold voltage). The circuit shown in FIG. 1 can be used to produce a voltage output varying between 3500 and 4000 volts by applying an input voltage, $V_{in}$, which is a sine wave having a 250 volt peak ($V_p = 250$), and by adding additional voltage multiplication stages onto the circuit. Using a switch, such as transistor switch 12, to cyclically vary the voltage multiplication factor, the output voltage can be varied by $2V_p = 500$ volts.

Alternatively, if transistor switch 10 is used to vary the multiplication factor, the output voltage can be varied by 500 volts by setting $V_p = 500$ volts (and by deleting a diode, such as 38, in a later multiplication stage).

Figure 2:
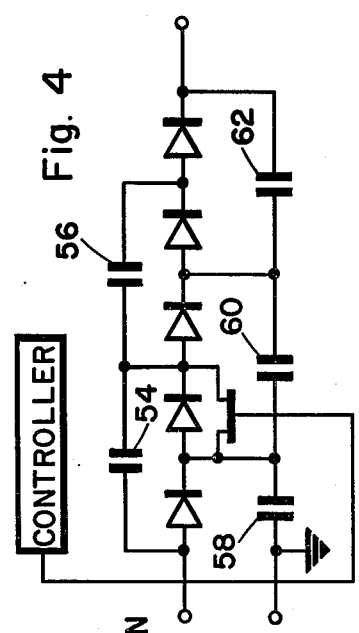
FIG. 2 is a block diagram of another embodiment of an electric power supply according to the invention for supplying power to a magnetron tube.

Another embodiment of the invention is depicted in the block diagram of FIG. 2. Each of the components shown in FIG. 2 is a conventional component, although the combination is new.

The heart of the power supply shown in FIG. 2 is the switch-mode power supply and the voltage-controlled high frequency power oscillator. The switch-mode power supply produces a DC power output whose voltage level is controlled by an input control signal.

The high frequency voltage-controlled power oscillator produces an AC voltage output whose magnitude is dependent upon the value of the DC input voltage to the power oscillator.

Now, the power supply of FIG. 2 operates in the following manner. The pulse width modulator (a standard integrated circuit manufactured by, for example, Signetics Corp., Fairchild Camera and Instruments Corp., or Texas Instruments, Inc.) supplies an input control signal to the switch-mode power supply in order to control the level of the DC output from the switch-mode power supply. This DC output in turn controls the AC voltage level out of the high frequency power oscillator. The AC voltage out of the power oscillator is partly directed to the magnetron heater filament and is partly directed to a voltage multiplier, the latter producing a high voltage for the magnetron cathode.

In operation, the voltage out of the oscillator is varied a relatively small amount in order to produce the larger voltage swing needed at the output of the voltage multiplier. The larger voltage swing at the output of the multiplier varies the voltage across the magnetron cathode and anode between values which are above and below the threshold value. Although the voltage to the magnetron heater filament is also varied, the variation is relatively small and does not allow the heater filament to substantially cool down.

Figure 3:
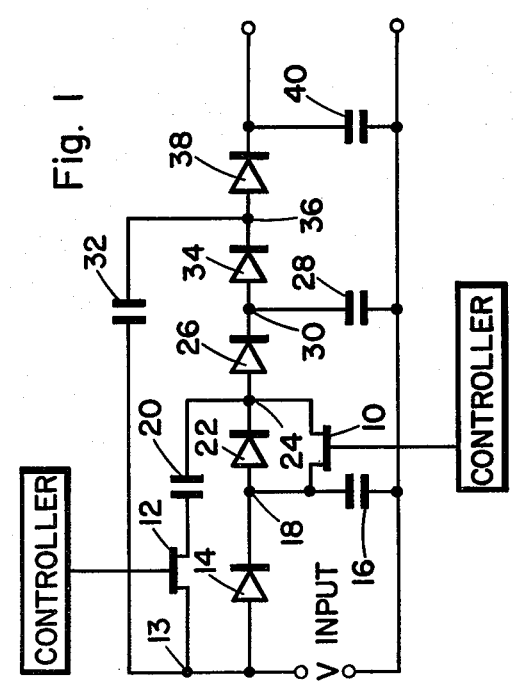
FIG. 3 is a schematic diagram of an embodiment of a switch-mode power supply which can be used in the magnetron power supply of FIG. 2.

FIG. 3 shows an example of a switch-mode power supply circuit which can be used in the power supply of FIG. 2. In the circuit, diode bridge 44 produces a full-wave rectified signal which is modulated by the pulse width modulator via a control circuit and transistor 46. The modulated full-wave rectified signal is then converted into a DC voltage by transformer 48, diode 50 and capacitor 52. The magnitude of the DC output voltage depends upon the degree of modulation of the full-wave rectified input signal. Selection of the circuit parameters are well within the ability of one with ordinary skill in the art.

Figure 4:
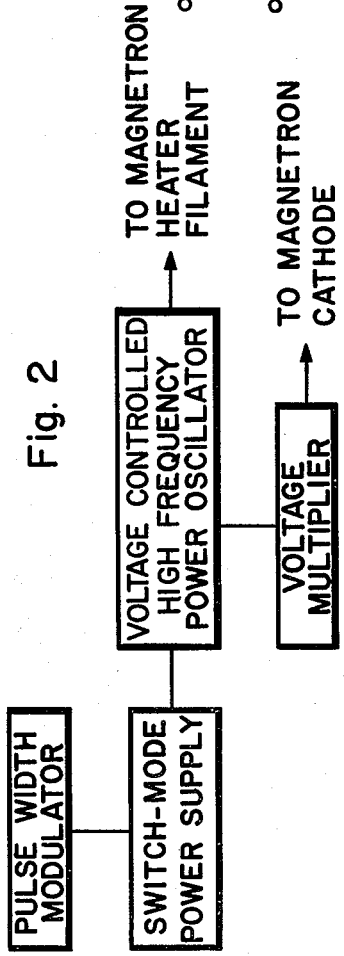
FIG. 4 is a schematic diagram of an embodiment of a voltage multiplier which can be used in the magnetron power supply of FIG. 2.

FIG. 4 shows another type of voltage multiplier, which is suitable for use in the power supply of FIG. 2. This circuit operates under the same basic principles as the voltage multiplier described with reference to FIG. 1. However, by arranging capacitors 54 and 56 in series and by arranging capacitors 58, 60, and 62 in series, the voltage ratings on these capacitors can be substantially lower than necessary for the capacitors used in the circuit shown in FIG. 1.

We claim:

1. An electric power supply for a magnetron, said magnetron having a heater, a cathode, and an anode, and having a threshold voltage value between the anode and cathode above which electric current flows from the anode to the cathode, said power supply comprising:
   power supply means for continuously supplying power to the heater; and
   voltage supply means for continuously supplying a voltage across the anode and the cathode, said voltage varying between a first value, which is substantially at or below the threshold voltage, and a second value, which is above the threshold voltage;
   characterized in that the means for continuously supplying a voltage across the anode and the cathode comprises a voltage multiplier circuit having at least two stages, at least one but not all of which stages are switchably connected in the circuit.

2. An electric power supply as claimed in claim 1, characterized in that the power supply further comprises control means for varying the voltage across the anode and the cathode in a repeating cycle.

3. An electric power supply as claimed in claim 2, characterized in that the control means regulates the proportion of each cycle during which the voltage across the anode and cathode is above the threshold voltage.

4. An electric power supply as claimed in claim 3, characterized in that the means for continuously supplying a voltage across the anode and cathode further comprises:
   a switch-mode power supply which produces a controllable DC output; and
   a voltage-controlled power oscillator, which produces an AC output having a controllable voltage to be fed to the voltage multiplier.

5. An electric power supply as claimed in claim 4, characterized in that the means for contiuously supplying power to the heater comprises a transformer.

6. A microwave generator comprising:
   a magnetron having a heater, a cathode, and an anode, said magnetron having a threshold voltage value between the anode and the cathode above which electric current flows from the anode to the cathode; and
   an electric power supply comprising:
   power supply means for continuously supplying power to the heater; and
   voltage supply means for continuously supplying a voltage across the anode and the cathode, said voltage varying between a first value, which is substantially at or below the threshold voltage, and a second value, which is above the threshold voltage;
   characterized in that the means for continuously supplying a voltage across the anode and the cathode comprises a voltage multiplier circuit having at least two stages, at least one but not all of which stages are switchably connected in the circuit.

7. A microwave generator as claimed in claim 6, characterized in that the power supply further comprises control means for varying the voltage across the anode and the cathode in a repeating cycle.

8. A microwave generator as claimed in claim 7, characterized in that the control means regulates the proportion of each cycle during which the voltage across the anode and cathode is above the threshold voltage.

9. A microwave generator as claimed in claim 8, characterized in that the means for continuously supplying a voltage across the anode and cathode further comprises:
   a switch-mode power supply which produces a controllable DC output; and
   a voltage-controlled power oscillator, which produces an AC output having a controllable voltage to be fed to the voltage multiplier.

10. A microwave generator as claimed in claim 9, characterized in that the means for continuously supplying power to the heater comprises a transformer.

* * * * *

UNITED STATES PATENT AND TRADEMARK OFFICE
CERTIFICATE OF CORRECTION

PATENT NO. : 4,481,447

DATED : November 6, 1984

INVENTOR(S) : EDWARD H. STUPP ET AL

It is certified that error appears in the above-identified patent and that said Letters Patent is hereby corrected as shown below:

>     In the Title Page change the Assignee from
>     "U.S. PHILIPS CORPORATION" to --NORTH AMERICAN PHILIPS
>     CORPORATION--.

Signed and Sealed this

Seventeenth Day of December 1985

[SEAL]

Attest:

DONALD J. QUIGG

Attesting Officer

Commissioner of Patents and Trademarks